(12) United States Patent
Guillemette

(10) Patent No.: US 6,382,944 B1
(45) Date of Patent: May 7, 2002

(54) UNIVERSALLY MOUNTED ADJUSTABLE DIE

(75) Inventor: Glen Albert Guillemette, West Warwick, RI (US)

(73) Assignee: Guill Tool & Engineering Co., Inc., West Warwick, RI (US)

( * ) Notice: Subject to any disclaimer, the term of this patent is extended or adjusted under 35 U.S.C. 154(b) by 0 days.

(21) Appl. No.: 09/189,286

(22) Filed: Nov. 10, 1998

(51) Int. Cl.⁷ ............................................. B29C 47/22
(52) U.S. Cl. ...................... 425/113; 425/381; 425/466
(58) Field of Search ................... 425/381, 466, 425/113, 190, 192 R

(56) References Cited

U.S. PATENT DOCUMENTS 4,472,129 A * 9/1984 Siard ........................... 425/381
5,286,183 A * 2/1994 Tonsi et al. .................. 425/113
5,346,384 A * 9/1994 Hegler et al. ................ 425/381
5,690,971 A * 11/1997 Buluschek .................. 425/113

FOREIGN PATENT DOCUMENTS

| CA | 635727 | * | 1/1962 |
| GB | 168915 | * | 7/1921 |

* cited by examiner

*Primary Examiner*—Nam Nguyen
*Assistant Examiner*—Joseph S Del Sole
(74) *Attorney, Agent, or Firm*—Perman & Green, LLP

(57) ABSTRACT

A die is mounted within an extrusion die assembly to pivot with respect to the die body and thereby adjust the concentric position of the die with respect to the tip and the product to be coated.

4 Claims, 3 Drawing Sheets

UNIVERSALLY MOUNTED ADJUSTABLE DIE

BACKGROUND OF THE INVENTION

Extrusion dies are frequently used to provide a tubular coating to a wire or other product which provides a generally cylindrical substrate. A typical die assembly 101 for performing this function is shown in FIG. 1. The basic assembly 101 consists of a die body 102, a tip 103, a die holder 104, and a die 105 held in place by end caps 106 and 114. The tip 103 is mounted within an axial bore of the die body 101 and is itself constructed with an axial bore 107 having a downstream exit portion 108. In operation, a wire or other tubular product 116 is fed through bores 107 and 108 to exit axially at 115. An annular extrusion passage 109, surrounds exit 115, and is positioned to receive flowing plastic and apply it, in a tubular layer, to the product 116 at exit 115.

The die assembly 101 is an assembly of machined parts, each having its own manufacturing tolerance. These tolerances tend to multiply with the assembly of the components. It is therefore a difficult task to maintain the desired coaxial relationship between the product and the extruded layer. An adjustment mechanism is generally needed to insure concentricity of the die and pin so as to provide an even thickness of the applied layer. This is generally accomplished simply by mounting the die holder 104 for adjustment, along x and y coordinates. The adjustment may be actuated through adjusting screws 112. As shown in FIG. 1, the adjustment motion of the prior art is radially towards and away from the axis 117, of the assembly 101 as a torque is applied to an adjustment screw 112. This may require a significant adjustment torque because of the high thrust loads on the die holder during operation.

SUMMARY OF THE INVENTION

The die assembly of this invention may be generally described as a cross head die in that it receives molten plastic from an extruder which enters the die passages in a direction that is transverse to the longitudinal axis of the assembly. The plastic must then be turned to flow downstream axially towards an annular tapered extrusion channel. The extrusion channel surrounds an axially extending passage through which a wire or tubular product may be directed to receive a cylindrical layer from the extrusion passage. In order to apply a cylindrical layer of constant radial depth, the position of the die relative to the tip must be precise. Since the degree of positioning accuracy cannot be maintained during assembly of the components, an adjustment mechanism is provided which allows the relative position of die and tip to be adjusted after assembly.

The die body of this invention is constructed with a recess at its downstream end to receive the die holder which supports the die in a fixed relation. The die holder and die body recess engage to allow a pivot motion between the two components. To accomplish the pivot motion, the recess is constructed with a spherical internal surface which mates with a spherical external surface constructed on the die holder. These surfaces engage and operationally cooperate to allow the die holder to pivot in a substantially universal motion. To actuate the adjustment, adjusting screws are provided in the die body which engage the die holder at a position axially displaced from the spherically engaged surfaces of the die body and die holder. This provides a mechanical advantage proportional to the distance that the adjustment screws are displaced from the fulcrum formed by the spherical surfaces and results in a reduction of the torque which must be exerted on the adjustment screws to correct the relative position of the die and tip. In this manner the die and tip may be accurately maintained in a concentric relation.

DESCRIPTION OF THE DRAWING

The invention of this application is described in more detail below with reference to the Drawing in which.

DESCRIPTION OF THE PREFERRED EMBODIMENT

Figure 1:
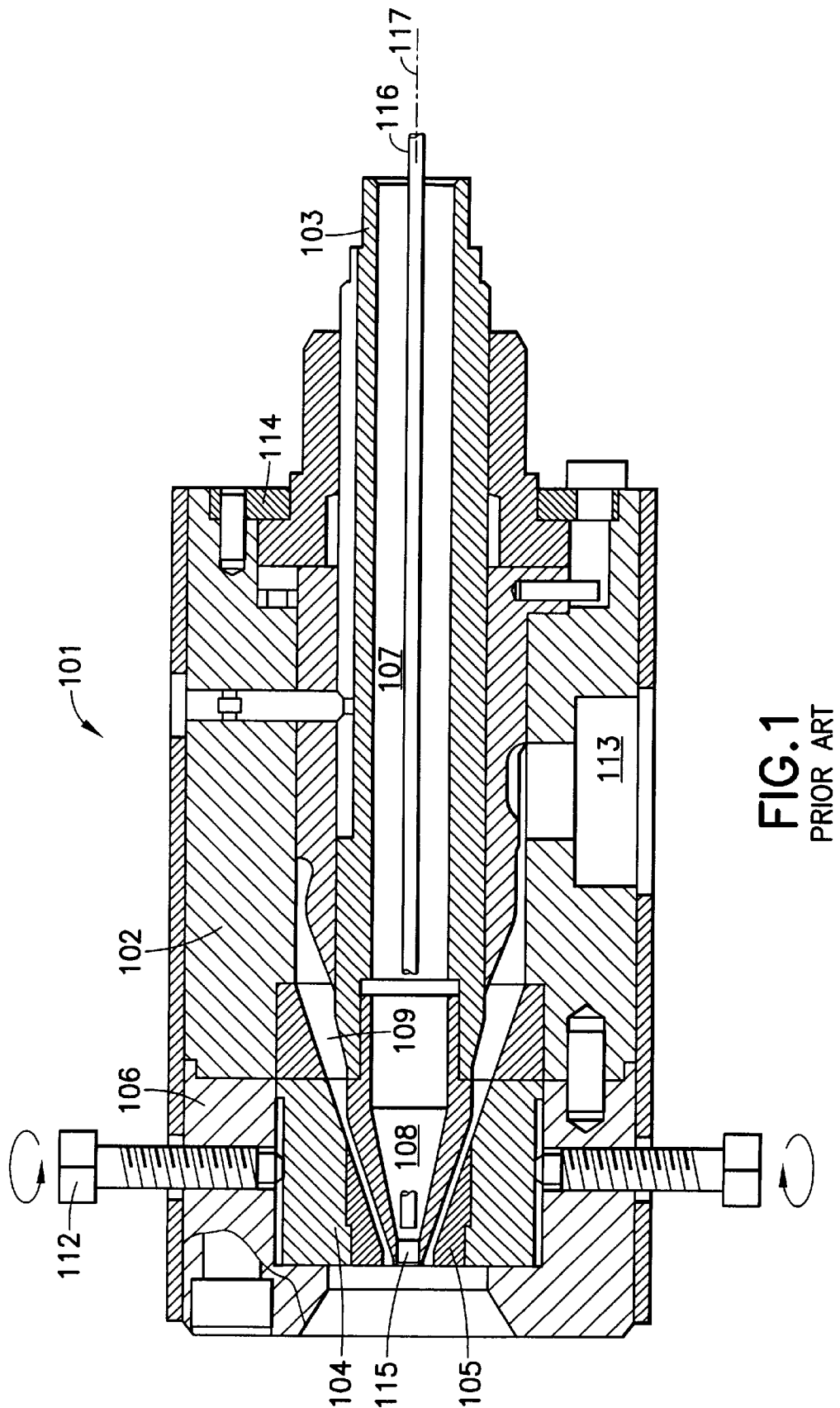
FIG. 1 is a sectional view of an extrusion die assembly showing the adjustment mechanism of prior art.
Figure 2:
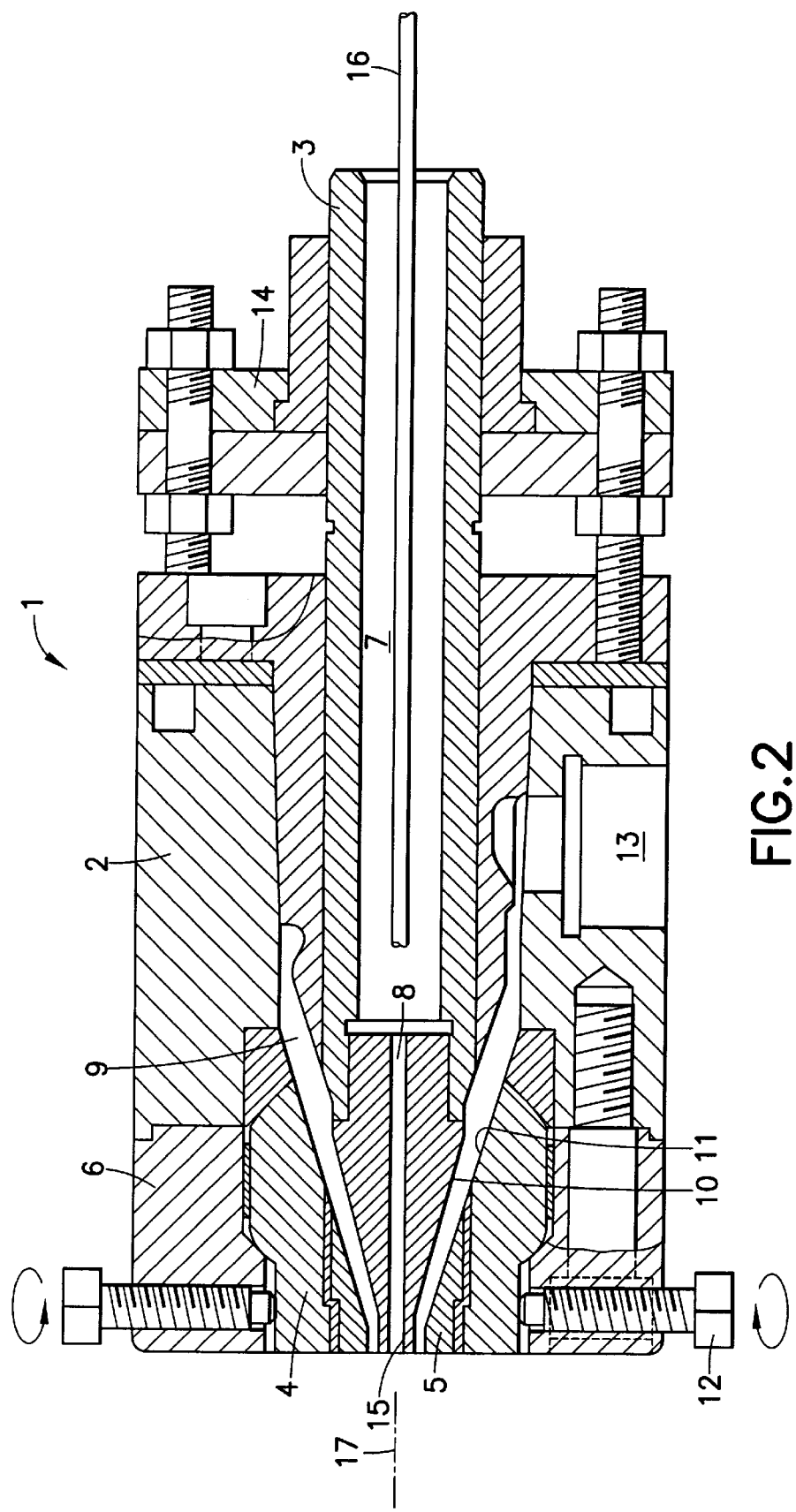
FIG. 2 is a sectional view of an extrusion die assembly showing the adjustment mechanism of this invention.

An extrusion die assembly 1, constructed in accordance with the subject invention, is shown in FIG. 2. The assembly 1 receives plastic from an extruder (not shown) and supplies it to a tapered annular extrusion channel 9 where it is extruded and applied to a wire 16. The general function of the die head 1 is to receive plastic at upstream inlet 13 and distribute it to downstream outlet 15 in a flow pattern that is evenly dispersed about the extrusion channel 9.

Figure 3:
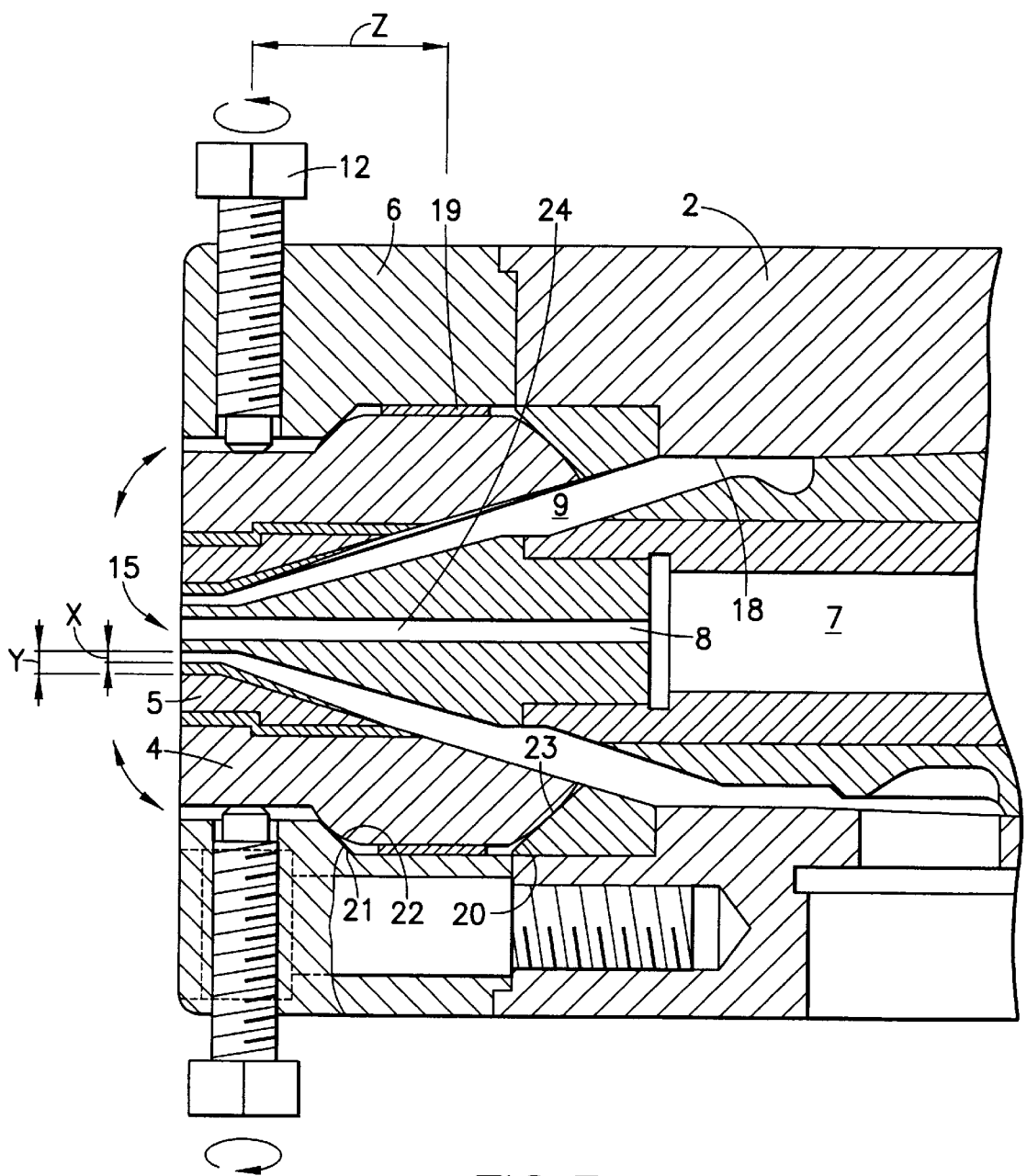
FIG. 3 is an enlarged sectional view of the adjustment mechanism of this invention.

Extrusion die assembly 1 consists of components which are assembled in alignment with the axis 17 and cooperate to form an extrusion passage 9. Die body 2 is a generally cylindrical element having an internal axial bore 18 having openings at its upstream and downstream ends. A tip 3 is assembled within the bore 18 and extends to the outlet 15 at the downstream end of the die body 2. Bore 18 is constructed with a recess 19 concentric with the bore 18. Die holder 4 is assembled within recess 19 and is constructed with a conical surface 11, which is tapered inward to form the exit 15 of the extrusion channel 9. A similarly shaped surface 10 is constructed on the downstream end of the tip 3 in a manner which provides a clearance with the surface 11 to form an annular tapered channel 9 in the assembled position. A die 5 may be removably fixed within the die holder 4 to complete the extrusion channel 9. As best shown in FIG. 3, the exit 15 of the extrusion passage is formed by the cooperation of the die 5 and the tip 3. The dimensions and configuration of the exit 15 is dependent on the relative position of these members. Pin 3 is constructed with an axial bore 7 having a downstream end 8 to provide a passage through which a product, such as a wire. 16 may be passed to receive a layer of plastic issuing from extrusion passage 9. In order to deposit a cylindrical layer of plastic on an elongated product in a uniform thickness, the die 5 and tip 3 must be positioned concentrically. The components of the die assembly may be secured in the assembled position by caps 6 and 14. The caps are attached to the die body 2 means of threads or by bolts.

Because of the accumulated tolerance errors within the assembly 1, it is necessary to provide a means by which the concentric position of the die 5 may be adjusted with respect to the pin 3. The overall motion required for adjustment is small, i.e., the difference between dimensions x and y as shown in FIG. 3. To provide this motion, the inner surface of the recess 19 is provided with a spherical seat and the outer surface of the die holder 4 is constructed with a mating spherical contour. More specifically a spherical surface 20 is machined into the recess 19 at its upstream side while a similar surface 21 is machined in the downstream side of the recess 19. Mating surfaces 22 and 23 are machined on the die holder 4 to engage the surfaces 20 and 21 respectively. Although a full spherical engagement could be constructed, it has been found that, by employing a suitable clearance, sufficient motion can be allowed with the partial spherical engagement shown. This reduces the machining required and simplifies the manufacture of the adjustment means of this invention.

Because of the accumulated tolerance errors within the assembly 1, it is necessary to provide a means by which the concentric position of the die 5 may be adjusted with respect to the pin 3. The overall motion required for adjustment is small, i.e., the difference between dimensions x and y as shown in FIG. 3. To provide this motion, the inner surface of the recess 19 is provided with a spherical seat and the outer surface of the die holder 4 is constructed with a mating spherical contour. More specifically a spherical surface 20 is machined into the recess 19 at its upstream side while a similar surface 21 is machined in the downstream side of the recess 19. Mating surfaces 22 and 23 are machined on the die holder 4 to engage the surfaces 20 and 21 respectively. Although a full spherical engagement could be constructed, it has been found that, by employing a suitable clearance, sufficient motion can be allowed with the partial spherical engagement shown. This reduces the machining required and simplifies the manufacture of the adjustment mechanism of this invention.

The spherical relationship between the engaging surfaces of the die holder 4 within the recess 19 allows the die to be pivoted within the extrusion passage 9, thereby adjusting the dimensions and configuration of the exit 15. To accomplish the adjustment, actuators, such as adjusting screws 12 are provided in the cap 6 at a distance z downstream of the center 24 of the spherical surfaces 20 through 23. The distance z provides a mechanical advantage through the leverage of the force exerted by the adjustment screws 12 on the die holder 4. The lever arm 2 also provides an adjustment movement which is maximized at the downstream end of the die holder 4 with a relatively small movement occurring at the upstream end of the element 4. In this manner an accurate and sensitive adjustment can be made, even under the loads placed on the components during operation of the extrusion die 1.

I claim:

1. An extrusion die assembly constructed to process a stream of flowing plastic from an upstream inlet to a downstream outlet, said inlet and outlet being displaced longitudinally along an axis of said assembly, said extrusion die assembly comprising:

a die body having a first bore extending longitudinally from the upstream to the downstream end of the assembly and an inlet constructed in the die body for receiving flowing plastic, said first bore also being constructed having a recess at the downstream end;

a tip element positioned within and coextensive with the first bore in alignment with the axis of the assembly, said tip element being constructed having a second bore extending longitudinally from the upstream end to the downstream end of said tip element to provide a passage for the processing of an elongated product;

a die assembled within the recess of the first bore, said die operatively associated with the tip to form the downstream outlet;

a passage, formed by the cooperation of the die body, tip, and die, for distributing the flow of plastic from said inlet to said outlet;

an adjustment mechanism constructed in the assembly to provide relative motion between the die body and the die, said mechanism allowing the adjustment of the outlet to compensate for inaccuracies in the relative positioning of the die with respect to the tip and thereby enabling the deposition of a uniform layer on the product; said mechanism comprising:

a first surface constructed in the recess of the die body, said first surface having at least a partially spherical shape, said spherical shape having a radius of curvature with a center, a second surface constructed on said die, said second surface having at least a partially spherical shape, said spherical shape having a radius of curvature with a center, said first and second surfaces being concentrically engaged at a mutual spherical interface positioned upstream and downstream of said center, said surfaces operatively cooperating to allow the die to pivot relative to the die body about said center of said radius of curvature; and an actuator constructed in the extrusion die assembly to exert a force on the die at a position downstream from the center of said radius of curvature of said first and second surfaces to cause movement between said surfaces and pivot the die to adjust the relative position of the die with respect to the tip.

2. An extrusion die assembly constructed to process a stream of flowing plastic from an upstream inlet to a downstream outlet, said inlet and outlet being displaced longitudinally along an axis of said assembly, said extrusion die assembly, as described in claim 1, wherein said actuator comprises at least one screw mounted in said assembly to engage a portion of the die and exert a force thereon as a torque is applied to the screw.

3. Apparatus for adjusting the relative position of a die in an extrusion die assembly having an inlet and an outlet, wherein the configuration of the outlet is adjustable, said apparatus comprising:

first and second surfaces constructed in the die assembly, said surfaces having at least a partially spherical shape, said spherical shape having a radius of curvature with a center, said first and second surfaces forming a mutual spherical interface positioned upstream and downstream of said center at which said surfaces operatively cooperate to allow the die to pivot relative to the die body about said center of said radius of curvature; and an adjustment mechanism constructed in the extrusion die assembly to exert a force on the die at a position downstream from the center of said radius of curvature of said first and second surfaces to cause movement between said surfaces and pivot the die to adjust the relative position of the die within the outlet.

4. Apparatus for adjusting the relative position of a die in an extrusion die assembly having an inlet and an outlet, wherein the configuration of the outlet is adjustable, as described in claim 3, wherein said adjustment mechanism comprises at least one screw mounted in said assembly to engage a portion of the die and exert a force thereon as a torque is applied to the screw.

* * * * *